(12) United States Patent
Huang et al.

(10) Patent No.: US 11,381,452 B2
(45) Date of Patent: Jul. 5, 2022

(54) NETWORK SLICING METHOD AND SYSTEM

(71) Applicant: HUAWEI TECHNOLOGIES CO., LTD., Guangdong (CN)

(72) Inventors: Yong Huang, Shenzhen (CN); Dong Lin, Shenzhen (CN); Yi Wang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 119 days.

(21) Appl. No.: 16/239,269

(22) Filed: Jan. 3, 2019

(65) Prior Publication Data
US 2019/0140904 A1    May 9, 2019

Related U.S. Application Data

(63) Continuation of application No. PCT/CN2017/093856, filed on Jul. 21, 2017.

(30) Foreign Application Priority Data

Jul. 25, 2016 (CN) .......................... 201610589662.6

(51) Int. Cl.
*G06F 15/16* (2006.01)
*H04L 41/0816* (2022.01)
(Continued)

(52) U.S. Cl.
CPC ...... *H04L 41/0816* (2013.01); *H04L 41/0806* (2013.01); *H04L 41/0893* (2013.01);
(Continued)

(58) Field of Classification Search
CPC .. H04L 47/20; H04L 41/0896; H04L 47/2441
See application file for complete search history.

(56) References Cited

U.S. PATENT DOCUMENTS

| 6,295,532 B1 * | 9/2001 | Hawkinson | H04L 47/24 707/999.102 |
| 6,594,268 B1 * | 7/2003 | Aukia | H04L 45/04 370/230 |

(Continued)

FOREIGN PATENT DOCUMENTS

| CN | 102972080 A | 3/2013 |
| CN | 103269282 A | 8/2013 |

(Continued)

OTHER PUBLICATIONS

Network Softwarization group:"Draft deliverable of Network softwarization for IMT-2020 networks", International Telecommunication Union, Telecommunication Standardization Sector, Study Period 2013-2016. Focus Group on IMT-2020, IMT-I-096r1, Beijing, 27-34 Oct. 2015.XP44242007. total 64 pages.

(Continued)

*Primary Examiner* — Hieu T Hoang
(74) *Attorney, Agent, or Firm* — Womble Bond Dickinson (US) LLP

(57) ABSTRACT

This application discloses a network slicing method. The method includes obtaining metadata information of each of multiple traffic flows, determining a classification policy according to metadata information of the multiple traffic flows, determining a network slicing policy according to the classification policy, and the network slicing policy includes a mapping relationship between a traffic flow type and a network slice and a slice weight of the network slice, and determining a resource node policy according to the network slicing policy, where the resource node policy includes a mapping relationship between at least one resource node in the network and the at least one network slice and a resource weight of each resource node, and the resource weight of the resource node indicates a ratio of a resource of each of (Continued)

network slices corresponding to the resource node to a resource of the resource node.

18 Claims, 8 Drawing Sheets

(51) Int. Cl.
      *H04L 41/0896*       (2022.01)
      *H04L 41/0806*       (2022.01)
      *H04L 41/0893*       (2022.01)
      *H04L 47/20*       (2022.01)
      *H04L 67/10*       (2022.01)

(52) U.S. Cl.
      CPC .......... *H04L 41/0896* (2013.01); *H04L 47/20* (2013.01); *H04L 67/10* (2013.01)

(56) References Cited

U.S. PATENT DOCUMENTS

| | | | |
|---|---|---|---|
| 6,778,530 B1 * | 8/2004 | Greene | H04L 45/00 370/389 |
| 7,095,759 B1 * | 8/2006 | Fitzgerald | H04L 47/10 370/468 |
| 9,100,326 B1 * | 8/2015 | Iliofotou | G06F 16/95 |
| 10,405,239 B2 * | 9/2019 | Oohira | H04W 8/06 |
| 10,735,956 B2 * | 8/2020 | Bae | H04W 12/04 |
| 2002/0186661 A1 * | 12/2002 | Santiago | H04L 47/20 370/252 |
| 2004/0071081 A1 * | 4/2004 | Rosenfled | H04L 47/2441 370/229 |
| 2005/0089054 A1 * | 4/2005 | Ciancaglini | H04L 49/3027 370/412 |
| 2007/0147341 A1 * | 6/2007 | Izumikawa | H04L 47/50 370/351 |
| 2008/0049752 A1 * | 2/2008 | Grant | H04L 45/00 370/392 |
| 2009/0122805 A1 * | 5/2009 | Epps | H04L 41/5009 370/417 |
| 2011/0125748 A1 * | 5/2011 | Wood | H04L 43/04 707/737 |
| 2013/0272216 A1 | 10/2013 | Riggio et al. | |
| 2014/0115126 A1 * | 4/2014 | Nam | H04L 45/66 709/220 |
| 2014/0233385 A1 * | 8/2014 | Beliveau | H04L 47/122 370/235 |
| 2014/0330937 A1 * | 11/2014 | O'Shea | H04L 67/1097 709/219 |
| 2015/0032883 A1 * | 1/2015 | Chandrashekar | H04L 65/4069 709/224 |
| 2015/0154257 A1 | 6/2015 | Xiong et al. | |
| 2015/0200860 A1 * | 7/2015 | Kam | H04L 43/026 370/235 |
| 2015/0351118 A1 * | 12/2015 | Arnott | H04W 16/14 370/252 |
| 2016/0006623 A1 | 1/2016 | Liu et al. | |
| 2016/0094449 A1 * | 3/2016 | Ramia | H04L 45/021 370/392 |
| 2016/0112335 A1 | 4/2016 | Bouanen et al. | |
| 2016/0203022 A1 | 7/2016 | Challa et al. | |
| 2016/0241435 A1 * | 8/2016 | Iordache | H04L 41/20 |
| 2016/0249353 A1 * | 8/2016 | Nakata | H04L 45/50 |
| 2016/0323186 A1 * | 11/2016 | Dillon | H04L 47/12 |
| 2016/0344803 A1 * | 11/2016 | Batz | H04M 15/66 |
| 2017/0208011 A1 * | 7/2017 | Bosch | H04L 45/64 |
| 2018/0352501 A1 * | 12/2018 | Zhang | H04W 48/14 |
| 2018/0376364 A1 * | 12/2018 | Keller | H04W 48/18 |
| 2019/0021047 A1 * | 1/2019 | Zong | H04L 61/1511 |
| 2019/0059021 A1 * | 2/2019 | Corroy | H04W 28/08 |
| 2019/0081894 A1 * | 3/2019 | Yousaf | H04L 45/38 |
| 2019/0098535 A1 * | 3/2019 | Fujishiro | H04W 28/0236 |
| 2019/0124597 A1 * | 4/2019 | Martin | H04W 36/30 |
| 2019/0141760 A1 * | 5/2019 | Stille | H04W 76/12 |

FOREIGN PATENT DOCUMENTS

| | | |
|---|---|---|
| CN | 104363159 A | 2/2015 |
| CN | 104679665 A | 6/2015 |
| EP | 2952031 B1 | 12/2015 |
| WO | 2014119701 A2 | 8/2014 |

OTHER PUBLICATIONS

NGMN Alliance, Ngmn 5G White Paper, Version 1.0, Feb. 2015, 125 pages.

3GPP TR 23.799 V0.6.0 (Jul. 2016), 3rd Generation Partnership Project; Technical Specification Group Services and System Aspects; Study on Architecture for Next Generation System (Release 14), 320 pages.

* cited by examiner

NETWORK SLICING METHOD AND SYSTEM

CROSS-REFERENCE TO RELATED APPLICATIONS

This application is a continuation of International Application No. PCT/CN2017/093856, filed on Jul. 21, 2017, which claims priority to Chinese Patent Application No. 201610589662.6, filed on Jul. 25, 2016. The disclosures of the aforementioned applications are hereby incorporated by reference in their entireties.

TECHNICAL FIELD

This application relates to the communications field, and more specifically, to a network slicing method, a network slicing system, a network node, and a terminal device.

BACKGROUND

A conventional network carries a single service. For example, a narrowband network carries a voice service, and a synchronous digital hierarchy (SDH) network carries a wireless backhaul service. For a determined service, each network can implement both efficient management and maximum service performance. With development of a Transmission Control Protocol/Internet Protocol (TCP/IP) technology and the Internet, a network operator expects to reduce network management and maintenance costs, and expects to use one physical network to carry more services. How to guarantee performance of all services in one physical network becomes a common concern. Currently, the industry generally recognizes that in terms of a future network, multiple virtual network slices should coexist in one physical network, so that a best balance between efficient service performance and low maintenance and management costs can be achieved. Because there are many types of services, and different types of services vary in network requirements, the most crucial problem is how to perform virtualized slicing management on a distributed network resource like a virtual central processing unit (vCPU) and a virtual storage (vStorage) in cloud computing, and how to use enough elasticity to match and provide network resources obtained by means of slicing to different applications for use while varied network requirements of the applications and efficient network utilization are guaranteed.

For a long time, both a data center (DC) network and a wide area network (WAN) network use a differentiated service (DiffServ) and high bandwidth to guarantee quality of service. This manner is simple without a need of sophisticated control, and therefore is popular. Because of this, bandwidth utilization is very low and bandwidth allocation is unbalanced in this manner, and therefore, quality of a high burstiness service, a low delay service, or the like cannot be better guaranteed.

In recent years, people realize that centralized and extensive network management is increasingly incapable of meeting various ever-increasing network requirements. With emergence of a software-defined networking (SDN) technology, there are many researches on a centralized flow control technology that is based on an SDN idea. A main idea of the technology is constructing a dynamic flow matrix by collecting flow directions of network flows, and adjusting a path in a network according to the flow matrix, so as to achieve optimal network performance and network utilization.

However, in a network in which multiple services coexist, it is difficult to take account of performance requirements of traffic flows of different service types in this optimum resource pursuing solution.

SUMMARY

Embodiments of this application provide a network slicing method, so that network slices can meet network requirements of different types of services.

According to a first aspect, a network slicing method is provided, and the method includes: obtaining metadata information of each of multiple traffic flows, where the metadata information of the traffic flow is used to indicate a flow feature of the traffic flow; determining a classification policy according to metadata information of the multiple traffic flows, where the classification policy includes a classification criterion of at least one traffic flow type, and the classification criterion includes a description of a range or a value of metadata of the traffic flow type; determining a network slicing policy according to the classification policy, where the network slicing policy is used to divide a network into at least one network slice, the network slicing policy includes a mapping relationship between a traffic flow type and a network slice and a slice weight of the network slice, and the slice weight indicates a ratio of a resource of the network slice to a resource of the network; and determining a resource node policy according to the network slicing policy, where the resource node policy includes a mapping relationship between at least one resource node in the network and the at least one network slice and a resource weight of each resource node, and the resource weight of the resource node indicates a ratio of a resource of each of network slices corresponding to the resource node to a resource of the resource node.

Therefore, according to the network slicing method in this embodiment of this application, the classification policy can be obtained based on the metadata information of the traffic flows, and accurate network requirements of different types of traffic flows can be obtained according to the classification criterion in the classification policy. In this way, a network slice weight of a network slice can be determined based on a network requirement of a traffic flow, so that network slices can meet network requirements of different types of services while efficient network utilization is met. In addition, the network slicing policy can be dynamically adjusted according to metadata information that is of the traffic flows and that is collected in real time, so that network slices can meet network requirements of different types of dynamically changed services.

In one implementation, the method further includes: sending configuration information to the resource node, where the configuration information includes an identifier of the at least one network slice corresponding to the resource node and resource weight information of the resource node, and the resource weight information is used to indicate a resource weight of the resource node.

In this way, on a same physical infrastructure, a virtual dedicated resource can be allocated to each service by means of management and arrangement. From a perspective of each service, the resource allocated to the service is dedicated and is isolated from a resource allocated to another service. Multiple services share the same physical infrastructure, so that physical resource utilization is improved and network costs can be reduced.

In another implementation, the determining a network slicing policy according to the classification policy includes: determining the network slicing policy according to the classification policy and a business support system (BSS) business policy or determining the network slicing policy according to the classification policy and an operation support system (OSS) business policy.

A slicing decision orchestration module can control, based on a business policy of a service slice, the service slice to meet a business requirement and bring business value.

In another implementation, the resource node includes a distributed network node, and the resource of the network slice includes a quantity of packet processing units, a quantity of packet sending queues and a packet sending queue length, and physical port bandwidth of the distributed network node; and/or the resource node includes a distributed computing node, and the resource of the network slice includes a quantity of virtual central processing units of the computing node; and/or the resource node includes a distributed storage node, and the resource of the network slice includes a quantity of storage units of the storage node.

In another implementation, the resource weight of the resource node includes a ratio of bandwidth that is occupied at a physical port of the resource node by each network slice corresponding to the resource node to total bandwidth of the physical port.

In another implementation, the metadata information of the traffic flow includes 5-tuple information of a packet in the traffic flow.

In another implementation, the metadata information of the traffic flow includes at least one of the following information: an establishment time of the traffic flow, packet burstiness in the traffic flow, an average packet length in the traffic flow, a transmission time interval between adjacent packets in the traffic flow, a total length of the traffic flow, total duration of the traffic flow, or an average rate of the traffic flow.

In another implementation, the determining a classification policy according to metadata information of the multiple traffic flows includes: classifying the multiple traffic flows according to an average packet length in each of the multiple traffic flows, an average interval between adjacent packets in each of the multiple traffic flows, and a total length of each of the multiple traffic flows; and determining the classification policy according to a classification result.

In another implementation, the method further includes: receiving a request message sent by a terminal device, where the request message carries 5-tuple information of a packet in a to-be-transmitted traffic flow, and the request message is used to request network slice information corresponding to the to-be-transmitted traffic flow; determining the network slice information according to the 5-tuple information and the network slicing policy; and sending a response message to the terminal device, where the response message carries the network slice information, so that the terminal device transmits the to-be-transmitted traffic flow according to the network slice information.

In another implementation, the method further includes: receiving a report message sent by the terminal device, where the report message carries metadata information of the to-be-transmitted traffic flow.

According to a second aspect, a traffic flow transmission method is provided, and the method includes: receiving a to-be-transmitted traffic flow, where the to-be-transmitted traffic flow carries a network slice identifier, and a network slice identified by the network slice identifier is corresponding to a traffic flow type of the to-be-transmitted traffic flow; performing flow table matching according to the network slice identifier; and sending the to-be-transmitted traffic flow according to a matched flow table and a resource weight, where the resource weight is a bandwidth weight of the network slice at a corresponding physical port of the network node.

According to the traffic flow transmission method in this embodiment of this application, a traffic flow is scheduled by using a network slice to which the traffic flow belongs, so that mutual interference between traffic flows of different service types is avoided, and performance requirements of the traffic flows of the different service types can be met.

In another implementation, the matched flow table includes an action field, and the action field includes the physical port and a queue identifier corresponding to the network slice; and the sending the to-be-transmitted traffic flow according to a matched flow table and a bandwidth weight includes: sending, according to the matched flow table, the to-be-transmitted traffic flow to a queue identified by the queue identifier, and scheduling the to-be-transmitted traffic flow at the physical port according to the bandwidth weight.

In another implementation, before the receiving a to-be-transmitted traffic flow, the method further includes: receiving configuration information sent by a centralized controller, where the configuration information carries network slice information and the resource weight, and the network slice information is used to indicate the network slice.

According to a third aspect, a traffic flow transmission method is provided, and the method includes: receiving a to-be-transmitted traffic flow; sending a request message to a centralized controller, where the request message carries 5-tuple information of a packet in the to-be-transmitted traffic flow, and the request message is used to request network slice information corresponding to the to-be-transmitted traffic flow; receiving the network slice information sent by the centralized controller according to the 5-tuple information, where a network slice indicated by the network slice information is corresponding to a service type of the to-be-transmitted traffic flow; and sending the to-be-transmitted traffic flow to a network node, where the packet in the to-be-transmitted traffic flow carries a network slice identifier identifying the network slice.

According to the traffic flow transmission method in this embodiment of this application, a traffic flow is scheduled by using a network slice to which the traffic flow belongs, so that mutual interference between traffic flows of different service types is avoided, and performance requirements of the traffic flows of the different service types can be met.

In another implementation, the method further includes: sending a report message to the centralized controller, where the report message carries metadata information of the to-be-transmitted traffic flow.

In another implementation, the method further includes: storing a correspondence between the to-be-transmitted traffic flow and the network slice.

According to a fourth aspect, a network slicing system is provided, and the network slicing system is configured to execute the method in the first aspect or any implementation of the first aspect. Specifically, the network slicing system includes a unit configured to execute the method in the first aspect or any implementation of the first aspect.

According to a fifth aspect, this application provides a network node, configured to execute the method in the second aspect or any implementation of the second aspect.

Specifically, the network node includes a unit configured to execute the method in the second aspect or any implementation of the second aspect.

According to a sixth aspect, this application provides a terminal device, configured to execute the method in the third aspect or any implementation of the third aspect. Specifically, the terminal device includes a unit configured to execute the method in the third aspect or any implementation of the third aspect.

According to a seventh aspect, a network slicing system is provided, and the slicing system includes a receiver, a transmitter, a processor, a memory, and a bus system. The receiver, the transmitter, the processor, and the memory are connected by using the bus system. The memory is configured to store an instruction. The processor is configured to execute the instruction stored in the memory, so as to control the receiver to receive a signal and control the transmitter to send a signal. When the processor executes the instruction stored in the memory, the processor executes the method in the first aspect or any implementation of the first aspect.

According to an eighth aspect, this application provides a network node, and the network node includes a receiver, a transmitter, a processor, a memory, and a bus system. The receiver, the transmitter, the processor, and the memory are connected by using the bus system. The memory is configured to store an instruction. The processor is configured to execute the instruction stored in the memory, so as to control the receiver to receive a signal and control the transmitter to send a signal. When the processor executes the instruction stored in the memory, the processor executes the method in the second aspect or any implementation of the second aspect.

According to a ninth aspect, this application provides a terminal device, and the terminal device includes a receiver, a transmitter, a memory, a processor, and a bus system. The receiver, the transmitter, the processor, and the memory are connected by using the bus system. The memory is configured to store an instruction. The processor is configured to execute the instruction stored in the memory, so as to control the receiver to receive a signal and control the transmitter to send a signal. When the processor executes the instruction stored in the memory, the processor executes the method in the third aspect or any implementation of the third aspect.

According to a tenth aspect, this application provides a computer readable medium, configured to store a computer program, and the computer program includes an instruction used to execute the method in the first aspect or any implementation of the first aspect.

According to an eleventh aspect, this application provides a computer readable medium, configured to store a computer program, and the computer program includes an instruction used to execute the method in the second aspect or any implementation of the second aspect.

According to a twelfth aspect, this application provides a computer readable medium, configured to store a computer program, and the computer program includes an instruction used to execute the method in the third aspect or any implementation of the third aspect.

DESCRIPTION OF EMBODIMENTS

The following clearly describes the technical solutions in the embodiments of this application with reference to the accompanying drawings in the embodiments of this application.

First, a network slicing technology related to this application is briefly described.

In the network slicing technology, one physical network is virtually divided into multiple logical networks that can coexist, to provide a most suitable resource configuration and network topology for various different services. Specifically, capabilities are flexibly assembled and arranged based on one physical network, and a network differentiation requirement of massive applications is met by using end-to-end network slices. For example, an industrial control slice may provide an ultra-low delay to accurately operate and interact with an industrial robot in a scenario such as disaster relief or power maintenance or a public utility slice may provide a low-power and ultra-dense connection to meet a requirement of a public service such as a smart water meter, a smart gas meter, or a smart meter.

Because there are many types of services, and different types of services vary in network requirements, how to implement network slices that adapt to a multi-service dynamic environment and how to orchestrate resources between network slices become problems.

To resolve the foregoing problems, the embodiments of this application provide a network slicing method.

Figure 1:
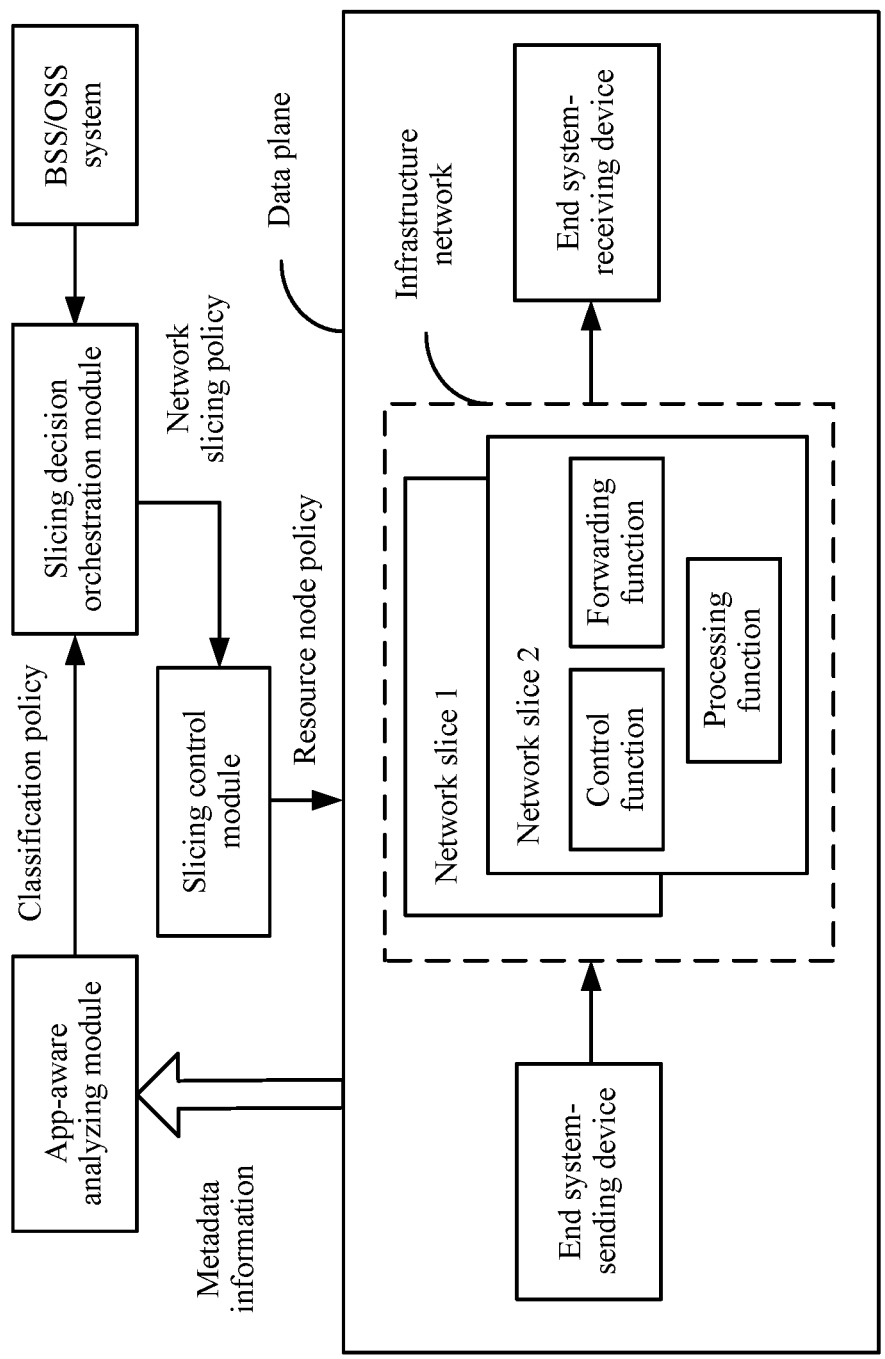
FIG. 1 is a schematic block diagram of a system architecture according to an embodiment of this application.

The network slicing method in the embodiments of this application may be applied to a system architecture shown in FIG. 1. A control plane of the system shown in FIG. 1 includes an application (App)-aware analysis module, a slicing decision orchestration module, and a slicing control module. The control plane may execute the network slicing method based on the embodiments of this application. Briefly, the App-aware analysis module may obtain metadata information of traffic flows from a data plane, and output a classification policy according to the metadata information. The data plane herein includes an end system-sending device, an end system-receiving device, and resource nodes in an infrastructure network between the end system-sending device and the end system-receiving device. The slicing decision orchestration module may determine a network slicing policy based on the classification policy, and output the network slicing policy to the slicing control module. The slicing control module may determine a resource node policy based on the network slicing policy, and configure an end-to-end network slice by sending configuration information to a network node. Finally, the network is divided into a network slice 1 and a network slice 2. The network slice 1 and the network slice 2 separately depend on forwarding, computing, and storage resources that serve a network slice and that are in multiple network nodes, computing nodes, and storage nodes that are distributed in the infrastructure network. Herein, the foregoing network nodes, computing nodes, and storage nodes may be referred to as resource nodes. The network slice 1 and the network slice 2 each include a forwarding function, a processing function, and a control function in the network that includes these resources, where the control function serves the forwarding function and the processing function.

In addition, a BSS business policy or an OSS business policy that is provided by a BSS/OSS system shown in FIG. 1 may be used as reference information when the control plane slices the network. The control plane may divide the network into the network slice 1 and the network slice 2 with reference to the BSS business policy or the OSS business policy. A business policy includes a network application for a business user, and needs to be guaranteed by using a specified quantity of network slices. For a business user or an application, a quantity of resources occupied by the business user or the application in a total network resource, or a minimum ratio or a maximum ratio of a resource occupied by the business user or the application to a total network resource is specified. On the premise that there are business policies, when making a slicing decision, the slicing decision orchestration module will ensure that a network slicing policy that is output after the decision conforms to these business policies.

On the data plane, the network slice 1 and the network slice 2 may be regarded as two virtual networks established between the end system-sending device and the end system-receiving device that are in a communication relationship. Each virtual network carries a traffic flow with a particular service performance requirement. In the network, each destination end executes independent congestion detection, and feeds a congestion status back to a source end. Distribution-based congestion control of the data plane is referred to as fast control. Fast control may be a combination of a network explicit congestion notification (ECN) technology and a TCP explicit congestion echo (ECE) feedback mechanism (RFC3168) technology. Details are not described herein.

It should be understood that the App-aware analysis module, the slicing decision orchestration module, and the slicing control module in the system architecture described in FIG. 1 may be three independent entity devices, or may be three function modules deployed on one entity. Alternatively, the App-aware analysis module and the slicing decision orchestration module may be integrated into one entity device, or the slicing decision orchestration module and the slicing control module may be integrated into one entity device. This is not limited in the embodiments of this application.

Figure 2:
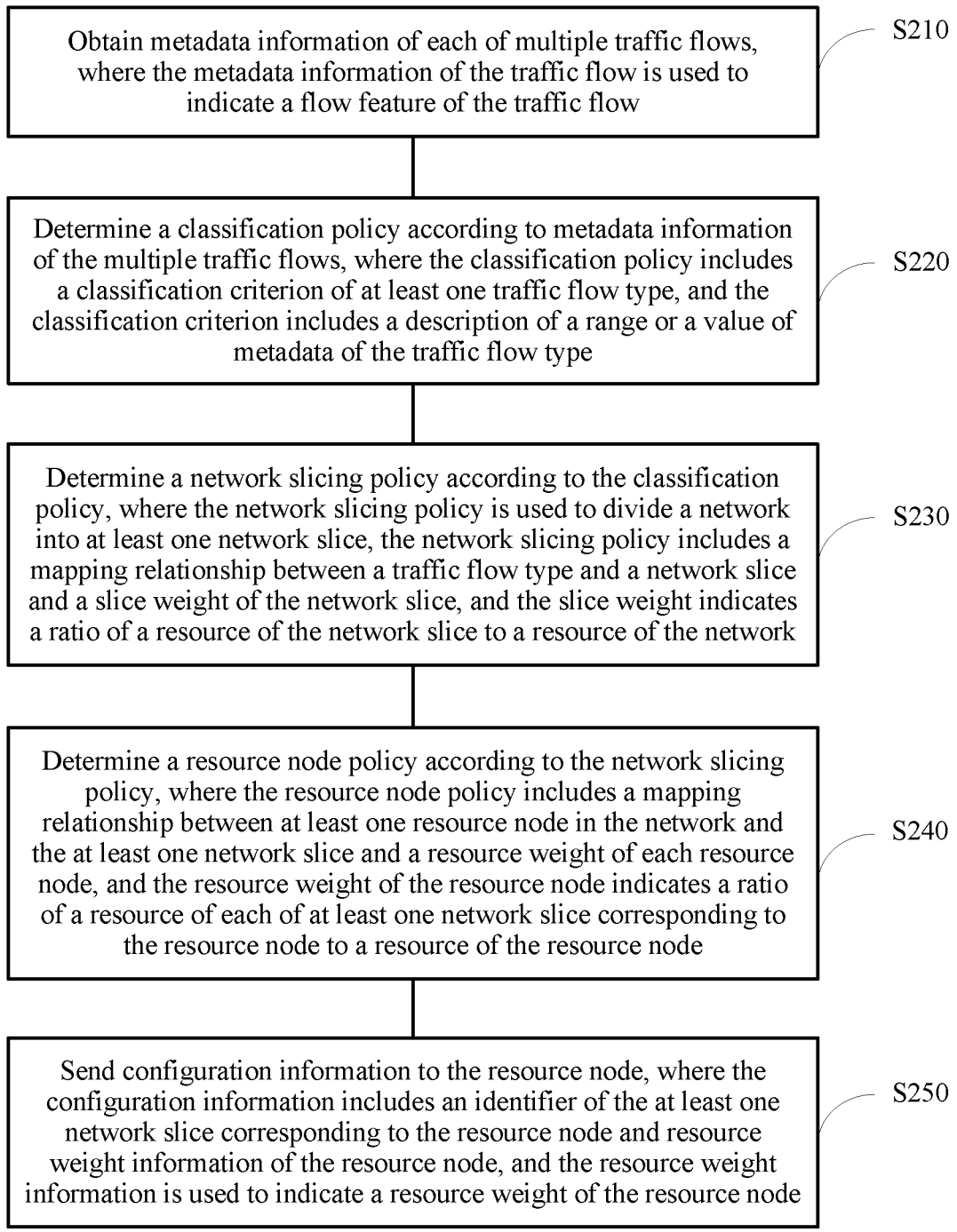
FIG. 2 is a schematic flowchart of a network slicing method according to an embodiment of this application.

FIG. 2 is a schematic flowchart of a network slicing method according to an embodiment of this application. The following describes in detail the network slicing method according to this embodiment of this application with reference to FIG. 1 and FIG. 2.

Operation S210. Obtain metadata information of each of multiple traffic flows, where the metadata information is used to indicate a flow feature of the traffic flow.

The traffic flow in this embodiment of this application is a sequenced packet set defined by 5-tuple information: a source Internet Protocol (IP) address, a destination IP address, a protocol number, a source port number, and a destination port number.

It should be noted that the traffic flow herein may be a historical traffic flow, or may be a to-be-transmitted traffic flow. When the traffic flow herein is a to-be-transmitted traffic flow, information about the first several packets in the traffic flow may be obtained, and metadata information that is of the traffic flow and that is extracted from the first several packets may support classification of the traffic flow.

Operation S210 may be executed by the App-aware analysis module shown in FIG. 1. Specifically, the App-aware analysis module may collect metadata information of multiple traffic flows in a network from a data plane in a distributed manner. Herein, the App-aware analysis module may periodically collect metadata information of a traffic flow from the data plane. According to the metadata information, the App-aware analysis module may analyze a flow feature of the traffic flow, such as a bandwidth feature or a delay feature of the traffic flow.

The metadata information may include 5-tuple information of the traffic flow. Further, the metadata information may further include an establishment time of the traffic flow, an average packet length in the traffic flow, packet burstiness in the traffic flow, a transmission time interval between adjacent packets in the traffic flow, a total length of the traffic flow, total duration of the traffic flow, or an average rate of the traffic flow.

The packet burstiness in the traffic flow in this embodiment of this application is a maximum quantity of packets in a same traffic flow that successively reach a queue or a sum of lengths of packets in a same traffic flow that successively reach a queue when the queue is scheduled.

Operation S220. Determine a classification policy according to metadata information of the traffic flows.

Operation S220 may be executed by the App-aware analysis module. Specifically, the App-aware analysis module may identify flow features of the traffic flows according to the metadata information, and may aggregate flows with a similar flow feature into one type. For example, the App-aware analysis module may determine a service type of a traffic flow according to a destination address and a source address of a packet in the traffic flow, or may infer an application type from a public port number carried in a packet in a traffic flow, such as a File Transfer Protocol (FTP) signaling port number TCP21, a domain name system (DNS) port number UDP67, or a Hypertext Transfer Protocol (HTTP) port number TCP80.

A process in which the App-aware analysis module aggregates flows with a similar flow feature into one type may be understood as a process of classifying the multiple traffic flows. When the multiple traffic flows are classified, a classification algorithm may be used, for example, a cluster analysis algorithm in machine learning may be used. This is not limited in this embodiment of this application.

The App-aware analysis module may obtain the classification policy by classifying the multiple traffic flows. The classification policy may include a classification criterion of a traffic flow type, that is, a classification criterion of each type of traffic flow. One type of traffic flow includes a description that is of a flow feature of the traffic flow and that is made from multiple metadata dimensions. One metadata dimension is embodied as a value range or a particular value of the type of traffic flow in terms of this metadata. For example, an average packet length is a type of metadata, and based on this dimension, it may be said that a traffic flow with an average packet length that is greater than 200 bytes and less than 400 bytes belongs to this type of traffic flow. Furthermore, the classification policy may further include a quantity of types. The classification criterion embodies a flow feature of the type of traffic flow, or an application type of the type of traffic flow. As an example instead of a limitation, the classification criterion may include features such as a packet length feature of the traffic flow, a duration feature of the traffic flow, and a burstiness feature of the traffic flow. The classification criterion may further include a data distribution feature of the traffic flow, such as an average value, a variance, or a local peak.

For example, multiple traffic flow types may be obtained after the multiple traffic flows are classified, and the multiple traffic flow types may include a traffic flow type F. It should be understood that the traffic flow type F is only an example name. The traffic flow type F may also be referred to as a traffic flow type A, or may also be referred to as a traffic flow type B. Herein, the traffic flow type F is only for distinguishing between different types of traffic flows.

Herein, for example, a classification criterion of the traffic flow type F is as follows:
  400 bytes>an average packet length in a traffic flow>200 bytes;
  300 ms>duration of the traffic flow>50 ms; and
  burstiness of the traffic flow<3000 bytes.

In addition, flow feature information of the traffic flow type F may further include the following content:
  Application type: MapReduce;
  a flow quantity of traffic flows: 340;
  average flow bandwidth of the traffic flows: 150 kilobits per second (kbps);
  a bandwidth distribution variance of the traffic flows: 50 Kbps.

The classification criterion of the traffic flow type F is only an example. This is not limited in this embodiment of this application. Other classification criteria that embody flow features of traffic flows fall within the scope of this application.

Optionally, when the classification policy is determined according to the metadata information of the multiple traffic flows, the multiple traffic flows may be classified according to an average packet length in each of the multiple traffic flows, an average interval between adjacent packets in each of the multiple traffic flows, and a total length of each of the multiple traffic flows, and then the classification policy is determined according to a classification result.

Specifically, the App-aware analysis module may classify the multiple traffic flows based on average packet lengths in the traffic flows, average intervals between adjacent packets in the traffic flows, and total lengths of the traffic flows. In this way, an obtained classification criterion of each type of traffic flow may include a feature of an average packet length in the traffic flow, a feature of an average interval between adjacent packets in the traffic flow, and a feature of a total length of the traffic flow.

Operation S230. Determine a network slicing policy according to the classification policy.

Operation S230 may be executed by the slicing decision orchestration module shown in FIG. 1. Specifically, the slicing decision orchestration module may receive the classification policy sent by the App-aware analysis module, and may determine the network slicing policy according to the classification criterion of each type of traffic flow. The network slicing policy may include a correspondence between a traffic flow type of a traffic flow and a network slice and a slice weight of each network slice. The slice weight of the network slice indicates a ratio of a resource of the network slice to a resource of a network.

Herein, the resource of the network is a total network resource. The total network resource may include a distributed network node resource, a distributed computing resource, and a distributed storage resource. Correspondingly, the resource of the network slice may include a distributed network node resource, a distributed computing resource, and a distributed storage resource. The distributed network node resource may include a quantity of packet processing units, a quantity of packet sending queues and a packet sending queue length, and physical port bandwidth of a network node. The distributed computing resource may include a quantity of virtual central processing units of a computing node. The distributed storage resource may include a quantity of storage units of a storage node.

In this embodiment of this application, a quantity of network slices, that is, a quantity of network slices into which the network is divided, a traffic flow type (that is, the foregoing traffic flow type) or an application type that is corresponding to each network slice, and a slice weight of each network slice may be determined according to the quantity of types and the classification criterion of each type of traffic flow. Herein, one network slice may be corresponding to one type of traffic flow. When classification criteria of multiple types of traffic flows are similar or a resource of the network is limited, one network slice may be corresponding to multiple types of traffic flows. A slice weight may be determined according to a classification criterion of a traffic flow type or an application type corresponding to a traffic flow type. For example, when it is determined, according to a classification criterion of a traffic flow type, that a traffic flow is a service with high bandwidth and low burstiness (for example, a determining method is as follows: An average bandwidth of the traffic flow is greater than 2 Mbytes, burstiness of the traffic flow is less than 5 Kbytes, and an average packet length in the traffic flow is greater than 500 bytes), a network resource may be allocated according to 80% bandwidth of peak bandwidth or when it is determined that another type of traffic flow is a service with a low delay and high burstiness (for example, a determining method is as follows: An average bandwidth of the traffic flow is less than 100K, burstiness of the traffic flow is greater than 2 Kbytes, an average packet length in the traffic flow is less than 300 bytes, and a flow length of the traffic flow is less than 2 Kbytes), a network resource may be allocated according to bandwidth that is three times the average bandwidth.

In one embodiment, when the network slicing policy is determined according to the classification policy, the network slicing policy may be determined according to the classification policy and a business support system BSS business policy, or may be determined according to the classification policy and an operation support system OSS business policy, or may be determined according to the classification policy, a BSS business policy, and an OSS business policy. Further, the network slicing policy may be determined according to a status of an available network resource.

Herein, the slicing decision orchestration module can control, based on a business policy of a service slice, the service slice to meet a business requirement and bring business value.

Operation S240. Determine a resource node policy according to the network slicing policy.

The resource node policy may include a mapping relationship between a resource node and a network slice and a resource weight. A resource weight of a resource node indicates a ratio of a resource of each of at least one network slice corresponding to the resource node to a resource of the resource node.

Herein, the resource node may include a distributed network node, a distributed computing node, and a distributed storage node.

Operation S240 may be executed by the slicing control module shown in FIG. 1. In one embodiment, after determining the network slicing policy, the slicing decision orchestration module may send the network slicing policy to the slicing control module. The slicing control module determines the resource node policy based on the network slicing policy, and completes decomposition of the slice weight into each distributed network resource, each distributed computing resource, and each distributed storage resource.

In one embodiment, after determining the slice weight of each network slice, the slicing control module may further need to determine a network resource node corresponding to a particular network slice, that is, determine a network resource node or several network resource nodes on which the particular network slice falls. In addition, the slicing control module may further need to determine a resource weight, that is, a ratio of a resource of the particular network slice to a resource of the network resource node, or a ratio of a resource of the particular network slice to a resource of each of the several network resource nodes. It should be understood that the particular network slice herein may be any one of multiple network slices.

In this way, on a same physical infrastructure, a virtual dedicated resource can be allocated to each service by means of management and arrangement. From a perspective of each service, the resource allocated to the service is dedicated and is isolated from a resource allocated to another service. Multiple services share the same physical infrastructure, so that physical resource utilization is improved and network costs can be reduced.

Therefore, according to the network slicing method in this embodiment of this application, the classification policy can be obtained based on the metadata information of the traffic flows, and accurate network requirements of different types of traffic flows can be obtained according to the classification criterion in the classification policy. In this way, a network slice weight of a network slice can be determined based on a network requirement of a traffic flow, so that network slices can meet network requirements of different types of services while efficient network utilization is met. In addition, the network slicing policy can be dynamically adjusted according to metadata information that is of the traffic flows and that is collected in real time, so that network slices can meet network requirements of different types of dynamically changed services.

In one embodiment, the resource weight of the resource node includes a ratio of bandwidth occupied at a physical port of the resource node by each network slice corresponding to the resource node to total bandwidth of the physical port. Specifically, multiple network slices may fall on a same network node. The multiple network slices occupy bandwidth of a physical port of the network node at a corresponding ratio.

In one embodiment, the method may further include: operation S250. Send configuration information to a resource node.

The configuration information may include an identifier of each of at least one network slice corresponding to the resource node and resource weight information. The resource weight information is used to indicate a resource weight of the resource node.

Operation S250 may be executed by the slicing control module shown in FIG. 1. Herein, after completing the decomposition of the slice weight into each distributed network node resource, each distributed computing resource, and each distributed storage resource, the slicing control module sends the configuration information to an infrastructure node in which a corresponding resource is located, that is, the foregoing resource node, for resource configuration.

In one embodiment, the slicing control module needs to configure each resource node after determining the resource node policy. The configuration information is delivered, so that the resource node can perform resource configuration according to the configuration information. Specifically, the resource node may determine, according to a network slice identifier in the configuration information, a network slice corresponding to the resource node, and may configure a resource for the network slice at a corresponding ratio according to the resource weight in the configuration information. For example, the resource node configures a bandwidth resource for the network slice at a corresponding ratio. In this way, mapping of a physical network to a logical network is implemented.

The slicing control module may control and adjust bandwidth weights of ports of some network nodes, so as to achieve dynamic orchestration of network resources of an entire network. Therefore, high bandwidth utilization is met while a performance requirement of each service is met.

In one embodiment, the method may further include: receiving a request message sent by a terminal device, where the request message carries 5-tuple information of a packet in a to-be-transmitted traffic flow, and the request message is used to request network slice information corresponding to the to-be-transmitted traffic flow; determining, according to the 5-tuple information and the network slicing policy, the network slice information corresponding to the to-be-transmitted traffic flow; and sending a response message to the terminal device, where the response message carries the network slice information, so that the terminal device transmits the to-be-transmitted traffic flow according to the network slice information.

Herein, the terminal device may be a network edge device. Specifically, the terminal device may be a network edge terminal device or server. For example, the terminal device may be the end system-sending device shown in FIG. 1.

The to-be-transmitted traffic flow may be transmitted according to the network slicing policy determined by using a method 200 shown in FIG. 2. Specifically, after the slicing decision orchestration module has determined the network slicing policy, the slicing control module may determine a traffic flow type of the to-be-transmitted traffic flow according to the received 5-tuple information of the to-be-transmitted traffic flow. Furthermore, a network slice corresponding to the to-be-transmitted traffic flow may be determined according to a mapping relationship between a traffic flow type and a network slice in the network slicing policy. After determining the network slice corresponding to the to-be-transmitted traffic flow, the slicing control module may send the network slice information to the terminal device, so that the terminal device transmits the to-be-transmitted traffic flow according to the network slice information.

In one embodiment, the method may further include: receiving a report message sent by the terminal device, where the report message carries metadata information of the to-be-transmitted traffic flow.

In one embodiment, in a process in which the terminal device sends a traffic flow, the terminal device may send metadata information of the to-be-transmitted traffic flow to the App-aware analysis module. In this way, the App-aware analysis module may dynamically determine a classification policy by analyzing a flow feature of the traffic flow. Furthermore, the slicing decision orchestration module may determine a network slicing policy according to the dynamic classification policy, so that network slices meet different type of dynamically changed services.

Figure 3:
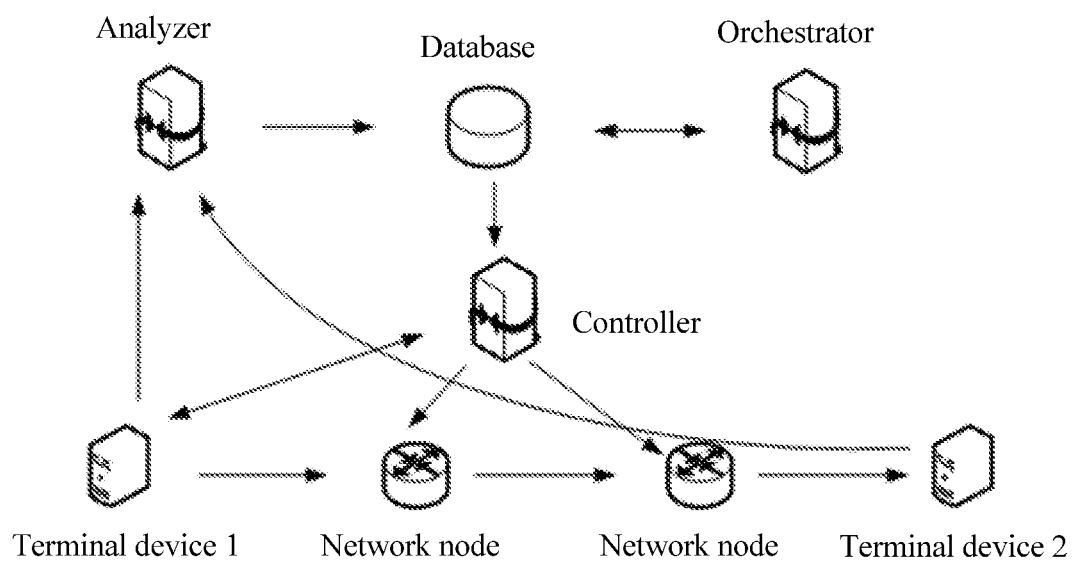
FIG. 3 is a schematic block diagram of another network architecture according to an embodiment of this application.

FIG. 3 is a schematic diagram of another system architecture according to an embodiment of this application. The network slicing method in the embodiments of this application may be applied to a system shown in FIG. 3.

As shown in FIG. 3, a control plane includes an analyzer, an orchestrator, and a controller that may respectively implement functions of the App-aware analysis module, the slicing decision orchestration module, and the slicing control module that are shown in FIG. 1. The analyzer, the orchestrator, and the controller are coupled by using a database. The following describes the network slicing method according to the embodiments of this application with reference to FIG. 3. It should be understood that for all related terms, words, or the like in the content described in the following with reference to FIG. 3, refer to the foregoing descriptions. For brevity, details are not described below again.

In one embodiment, each edge terminal device reports metadata information of traffic flows to the analyzer. In this embodiment of this application, a terminal device 1 and a terminal device 2 report metadata information of traffic flows to the analyzer. The analyzer aggregates reports from the terminal device 1 and the terminal device 2, classifies the traffic flows to obtain a classification policy, and sends the classification policy to the database. The orchestrator reads the classification policy from the database, and may determine a network slicing policy. Further, the orchestrator may determine the network slicing policy with reference to both the classification policy, and a BSS business policy or an OSS business policy. The orchestrator sends the network slicing policy to the database. The controller may read the network slicing policy from the database, determine a resource node policy according to the network slicing policy, and send configuration information to a corresponding network node. After receiving the configuration information, the network node may configure a corresponding resource for a corresponding network slice according to the configuration information.

In this embodiment of this application, an interface between entities is implemented by using a database, a process in which an entity A (such as the analyzer) sends information I (such as the metadata information) to the database and an entity B (such as the orchestrator) reads the information I from the database is equal to a process in which the entity A sends the information I to the entity B. In this embodiment of this application, entity devices on the control plane may interact with each other by using the database. For example, the analyzer and the orchestrator may interact with each other by using the database. An entity device on the control plane and a terminal device on a data plane may also interact with each other by using the database. For example, the analyzer and the terminal device 1 may interact with each other by using the database. In addition, in this embodiment of this application, a network device, a computing device, and a storage device may interact with each other by using the database. This is not limited in this embodiment of this application.

Therefore, according to the network slicing method in this embodiment of this application, the classification policy can be obtained based on the metadata information of the traffic flows, and accurate network requirements of different types of traffic flows can be obtained according to a classification criterion in the classification policy. In this way, a network slice weight of a network slice can be determined based on a network requirement of a traffic flow, so that network slices can meet network requirements of different types of services while efficient network utilization is met. In addition, the network slicing policy can be dynamically adjusted according to metadata information that is of the traffic flows and that is collected in real time, so that network slices can meet network requirements of different types of dynamically changed services.

Figure 4:
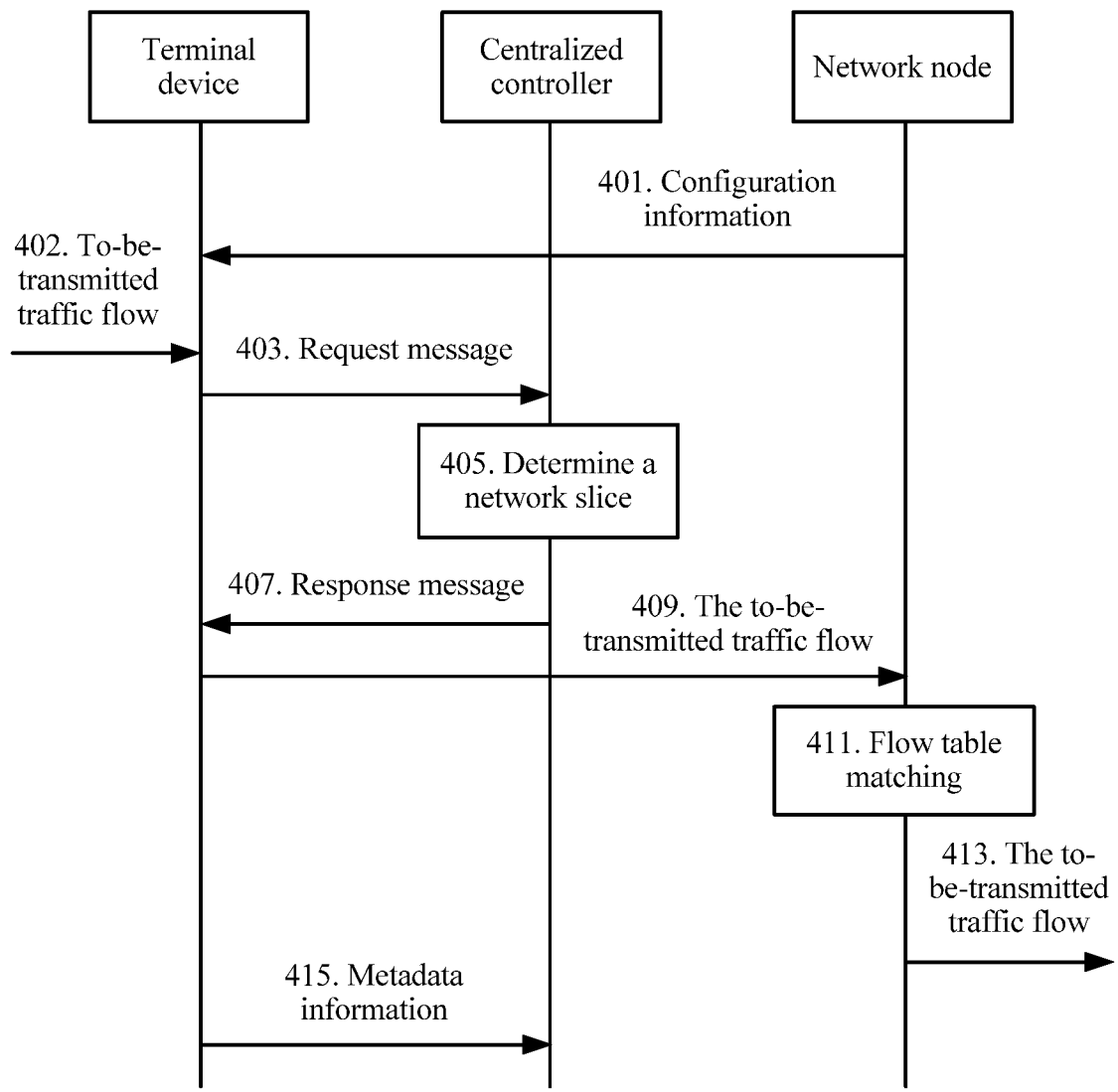
FIG. 4 is a schematic flowchart of a traffic flow transmission method according to an embodiment of this application.

FIG. 4 is a schematic flowchart of a traffic flow transmission method according to an embodiment of this application. It should be understood that for all related terms, words, or the like in the content described in the following with reference to FIG. 4, refer to the foregoing descriptions. For brevity, details are not described below again.

Operation 402. A terminal device receives a to-be-transmitted traffic flow.

Herein, there may be one to-be-transmitted traffic flow or may be multiple to-be-transmitted traffic flows.

It should be understood that the terminal device is a network edge device. For example, the terminal device may be the end system-sending device shown in FIG. 1, or may be the terminal device 1 shown in FIG. 3.

Operation 403. The terminal device sends a request message to a centralized controller.

The request message carries 5-tuple information of a packet in the to-be-transmitted traffic flow. The request message is used to request network slice information corresponding to the to-be-transmitted traffic flow.

It should be understood that the centralized controller herein is only an example name. The centralized controller may also be referred to as a centralized manager, a slice manager, or the like. The centralized controller may be understood as an entity device that integrates three function modules: the App-aware analysis module, the slicing decision orchestration module, and the slicing control module that are shown in FIG. 1. Alternatively, the centralized controller may be regarded as an entity device that integrates functions of three entity apparatuses: the analyzer, the orchestrator, and the controller that are shown in FIG. 3.

It should be further understood that in specific implementation, that the terminal device sends the 5-tuple information of the packet in the to-be-transmitted traffic flow to the centralized controller may be: the terminal device sends the 5-tuple information of the packet in the to-be-transmitted traffic flow to the slicing control module shown in FIG. 1 or the controller shown in FIG. 3.

Operation 405. The centralized controller may determine, according to 5-tuple information and a network slicing policy, network slice information corresponding to the to-be-transmitted traffic flow.

In one embodiment, the centralized controller stores the network slicing policy, and the network slicing policy stores a correspondence between a traffic flow type and a network slice. After receiving the 5-tuple information of the to-be-transmitted traffic flow, the centralized controller may determine a traffic flow type of the to-be-transmitted traffic flow by analyzing a flow feature of the to-be-transmitted traffic flow, and then determine, according to the correspondence between a traffic flow type and a network slice, the network slice information corresponding to the to-be-transmitted traffic flow. Furthermore, the centralized controller may determine a network slice identifier corresponding to the to-be-transmitted traffic flow.

Operation 407. The centralized controller sends a response message to the terminal device, where the response message is used to indicate the network slice information.

In one embodiment, after determining a network slice corresponding to the to-be-transmitted traffic flow, the centralized controller sends the response message to the terminal device, so as to notify the terminal device of the network slice corresponding to the to-be-transmitted traffic flow. In an embodiment, the response message may carry the slice identifier of the network slice.

Operation 409. The terminal device sends the to-be-transmitted traffic flow to a network node. The packet in the to-be-transmitted traffic flow may carry the network slice identifier.

It should be understood that the network node herein may be the foregoing distributed network node.

In an embodiment, the terminal device may store a correspondence between the to-be-transmitted traffic flow and the network slice. Furthermore, the terminal device may store a correspondence between the to-be-transmitted traffic flow and the network slice identifier. Then, after receiving a subsequent packet in the traffic flow, the terminal device may directly find the network slice identifier based on the stored correspondence, and forwards a packet that is in the traffic flow and that carries the network slice identifier. In this way, forwarding efficiency can be improved while overheads are reduced.

In another manner, the centralized controller may send, to the terminal device, a traffic flow identifying criterion corresponding to a slice, that is, one or more of the foregoing traffic flow classification criteria. In this way, the terminal device may complete classification of a traffic flow and addition of a network slice identifier to a packet.

Operation 411. The network node performs flow table matching according to a network slice identifier.

In this embodiment of this application, the network node may preconfigure a fuzzy flow table with a network slice identifier that is used as a match item. After receiving the to-be-transmitted traffic flow, the network node may generate, based on a fuzzy match, an accurate flow table with a network slice identifier that is used as a match item. Alternatively, by using an SDN method, the network node sends the first several packets in the to-be-transmitted traffic flow to the controller, and the controller delivers an accurate flow table with a network slice identifier that is used as a match item.

Operation 413. The network node sends the traffic flow according to a matched flow table and a resource weight, where the resource weight is a bandwidth weight of a network slice in the network node.

In one embodiment, before operation 402, the method may further include: 401. The network node receives configuration information sent by the centralized controller, where the configuration information carries an identifier of the network node and the resource weight.

In one embodiment, the network node may obtain, by querying the centralized controller, the resource weight corresponding to the network slice, or may obtain the resource weight by using the configuration information actively delivered by the centralized controller. Herein, the network node forwards the to-be-transmitted traffic flow according to the matched flow table and the resource weight.

In one embodiment, the matched flow table includes an action field. The action field may include a physical port and a queue identifier corresponding to the network slice that the network node sends the to-be-transmitted traffic flow according to a matched flow table and a bandwidth weight including sending, by the network node according to the matched flow table, the to-be-transmitted traffic flow to a queue identified by the queue identifier, and scheduling the to-be-transmitted traffic flow at the physical port according to the bandwidth weight.

For example, the matched flow table is represented as follows: <match: flow2&tagC, action: output to port:queue NE3:C>. Herein, a match field is used by a network node to perform matching for a received to-be-transmitted traffic flow 2, and tag C is an identifier of a network slice C. The action field is used to indicate processing that needs to be performed by the network node on the flow 2. Herein, the action field indicates that the network node needs to send the to-be-transmitted traffic flow to a queue that is corresponding to the network slice C and that is of the physical port connected to a network element (NE) 3. It should be understood that one network node may be corresponding to multiple network slices, and multiple network slices may be corresponding to multiple queues of a same physical port. For example, one network slice may be corresponding to one queue. This is not limited in this embodiment of this application.

The network node may use a weighted fair queuing (WFQ) algorithm to schedule the to-be-transmitted traffic flow at a sending place of the physical port connected to the NE 3. A quantity of queues used in the WFQ may be a quantity of network slices, a scheduling weight of a queue in the WFQ may be a bandwidth weight obtained after a slice weight of each network slice corresponds to the physical network port. When to-be-transmitted traffic flow scheduling is being implemented, in consideration of balancing queue scheduling costs, the to-be-transmitted traffic flow scheduling may be approximately implemented by using a weighted round robin (WRR) algorithm.

Operation 415. The terminal device sends a report message to the centralized controller. The report message is used to report metadata information corresponding to the to-be-transmitted traffic flow.

In one embodiment, in a process of transmitting a traffic flow, the terminal device may send 5-tuple information of the to-be-transmitted traffic flow to the centralized controller. In this way, the centralized controller may dynamically determine a classification policy by analyzing a flow feature of the traffic flow. Further, the centralized controller may determine the network slicing policy according to the dynamic classification policy, so that network slices meet different types of dynamically changed services.

According to the traffic flow transmission method in this embodiment of this application, a traffic flow is scheduled by using a network slice to which the traffic flow belongs, so that mutual interference between traffic flows of different service types is avoided, and performance requirements of the traffic flows of the different service types can be met.

Figure 5:
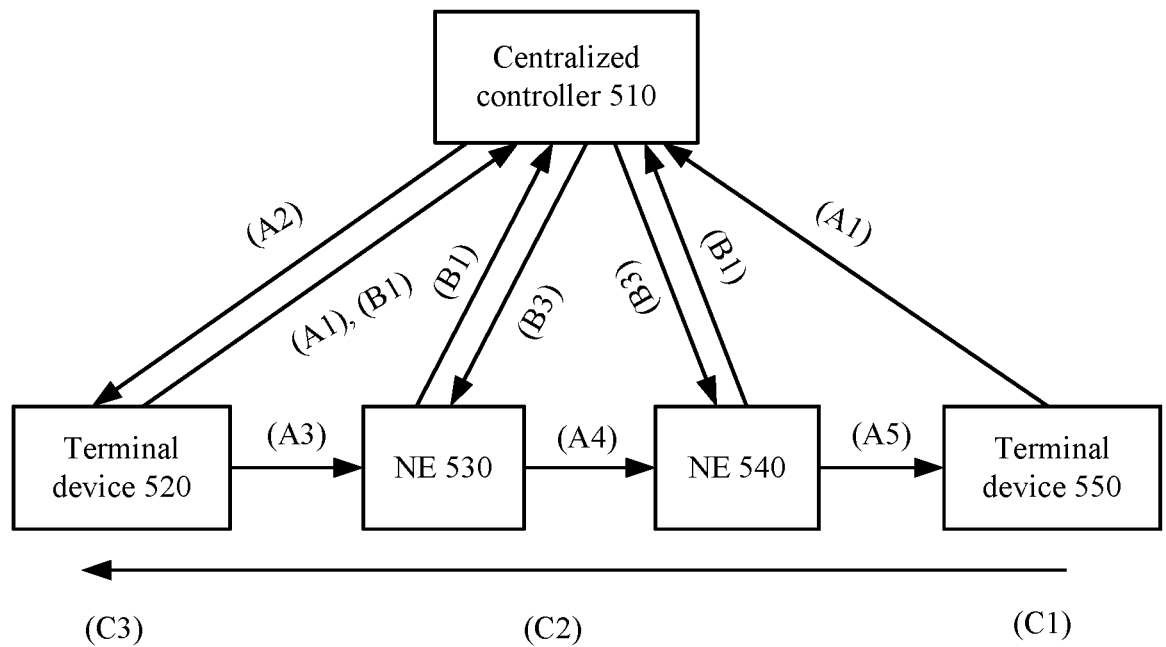
FIG. 5 is a schematic block diagram of another network architecture according to an embodiment of this application.

The following describes in detail the traffic flow transmission method according to the embodiments of this application with reference to FIG. 5.

A centralized controller 510 shown in FIG. 5 may be used to execute the corresponding operations executed by the centralized controller in the method shown in FIG. 4. An NE 530 and an NE 540 may be corresponding to the foregoing network node. With reference to FIG. 5, the following describes in detail a processing process of communication from a terminal device 520 to a terminal device 550 and a procedure of an interaction between a data plane and a control plane.

Operation (A1). When the terminal device 520 needs to send a new traffic flow (or referred to as a to-be-transmitted traffic flow) flow 1 to the terminal device 550, the terminal device 520 may first send a request message to the centralized controller 510, where the request message may carry 5-tuple information of a packet in the flow 1, and is used to request, from the centralized controller 510, network slice information corresponding to the flow 1.

Operation (A2). The centralized controller 510 may determine, based on a mapping relationship between a traffic flow type and a network slice in a previously generated network slicing policy, that the flow 1 is corresponding to a network slice B, and the centralized controller 510 sends, to the terminal device 520 by using a response message, the information that the flow 1 is corresponding to the network slice B.

Operation (A3). The terminal device 520 may store the correspondence that the flow 1 is corresponding to the network slice B, and add, to the packet in the flow 1, a tag B indicating that the flow 1 is corresponding to the network slice B, and then the terminal device 520 sends, to a network, that is, the network device NE 530 shown in FIG. 5, the flow 1 that carries the tag.

Operation (A4). The NE 530 may obtain a matched flow table <match: flow1&tagB, action: output to port:queue NE540:B> by means of flow table matching, and the NE 530 sends, according to the matched flow table, the flow 1 to a queue that is corresponding to the network slice B and that is of a physical port connected to the network device NE 540. Herein, for a flow table matching method and packet scheduling, refer to the foregoing descriptions. For brevity, details are not described herein again.

Operation (A5): The NE 530 sends the flow 1 to the next network node NE 540 based on scheduling, and the NE 540 executes a flow table matching operation and schedules the flow 1 like the NE 530. Finally, the NE 540 sends the flow 1 to the terminal device 550. After the terminal device 550 receives the flow 1, transfer of the flow1 in the network ends.

The following slow control cycle exists in the foregoing process:

Operation (B1): The terminal device 520 sends, to the centralized controller 510, packet metadata information corresponding to the flow 1. The metadata information herein may include an establishment time of the flow 1, a 5-tuple of a packet in the flow 1, a packet length in the flow 1, current maximum packet burstiness in the flow 1, a receiving time interval between a packet and a previous packet in the flow 1, a current total length of the flow 1, current total duration of the flow 1, and the like.

The NE 530 and the NE 540 may send, to the centralized controller 510, occupied bandwidth that is of the physical port and that is corresponding to each network slice and queue length information that is of the physical port and that is corresponding to each network slice.

The terminal device 550 sends, to the centralized controller 510, the metadata information corresponding to the flow 1, such as a packet receiving time of the flow 1, the current maximum packet burstiness, the receiving time interval between a packet and a previous packet, and the current total duration of the flow 1.

The centralized controller 510 receives metadata information of multiple traffic flows (including the flow 1), performs classification computing, and finally generates a network slicing policy. For a specific classification method, refer to the foregoing descriptions. Details are not described herein again. The centralized controller 510 further determines a resource node policy based on the network slicing policy. For details, refer to the foregoing descriptions. The centralized controller 510 delivers configuration information determined according to the resource node policy to a corresponding network forwarding, computing, and storage infrastructure on the data plane, to guarantee network slice isolation.

A fast control cycle exists in the foregoing process, and has the following operations:

Operation (C1). The terminal device 550 collects statistics about congestion degree information of the network slice B corresponding to the flow 1 on a logical channel from the terminal device 520 to the terminal device 550. A specific statistic manner may be obtained by using corresponding congestion status information that is carried in a packet by the NE 530 and the NE 540 based on a queue length when the queue is scheduled at an outlet.

Operation (C2). The terminal device 550 sends the congestion status information to the terminal device 520 by adding the congestion status information to a packet or by using a dedicated message packet.

Operation (C3). The terminal device 520 adjusts, based on the congestion status information, a sending rate currently corresponding to the network slice B. Specifically, when a feedback is that the network slice B is not congested, the sending rate is increased according to a bandwidth weight of the network slice B or when a feedback is that the network slice B is congested, the sending rate is decreased according to a bandwidth weight and a congestion status of the network slice B.

According to the traffic flow transmission method in this embodiment of this application, a traffic flow is scheduled by using a network slice to which the traffic flow belongs, so that mutual interference between traffic flows of different service types is avoided, and performance requirements of the traffic flows of the different service types can be met.

The foregoing describes in detail the network slicing method and the traffic flow transmission method according to the embodiments of this application with reference to FIG. 1 to FIG. 5. The following describes a network slicing system according to the embodiments of this application with reference to FIG. 6.

Figure 6:
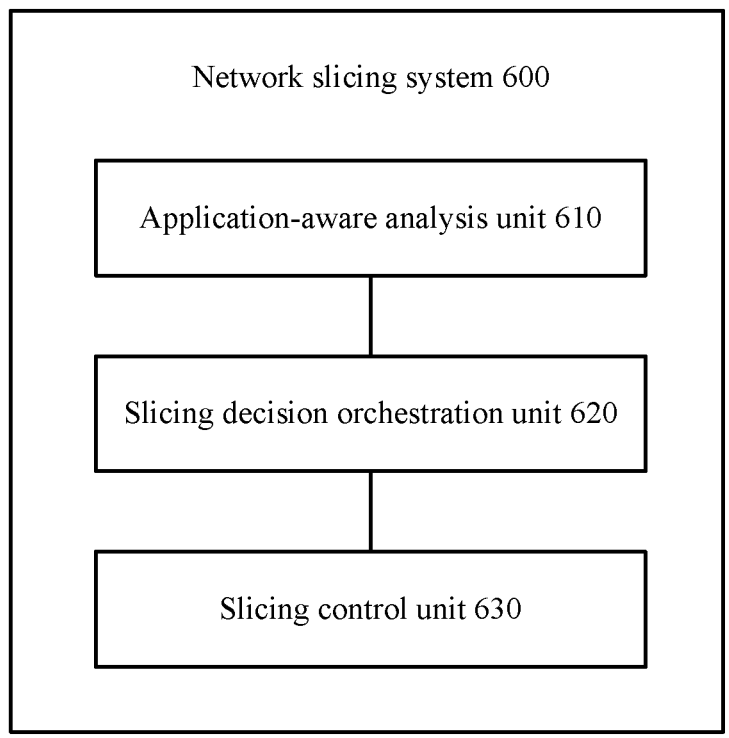
FIG. 6 is a schematic block diagram of a network slicing system according to an embodiment of this application.

FIG. 6 shows a network slicing system 600 according to embodiment of this application. The network slicing system 600 includes an application-aware analysis unit 610, a slicing decision orchestration unit 620, and a slicing control unit 630.

The application-aware analysis unit 610 is configured to: obtain metadata information of each of multiple traffic flows, where the metadata information of the traffic flow is used to indicate a flow feature of the traffic flow; and determine a classification policy according to metadata information of the multiple traffic flows, where the classification policy includes a classification criterion of at least one traffic flow type, and the classification criterion includes a description of a range or a value of metadata of the traffic flow type.

The slicing decision orchestration unit 620 receives the classification policy sent by the application-aware analysis unit 610, and is configured to determine a network slicing policy according to the classification policy, where the network slicing policy is used to divide a network into at least one network slice, the network slicing policy includes a mapping relationship between a traffic flow type and a network slice and a slice weight of the network slice, and the slice weight indicates a ratio of a resource of the network slice to a resource of the network.

The slicing control unit 630 receives the network slicing policy sent by the slicing decision orchestration unit 620, and is configured to determine a resource node policy according to the network slicing policy, where the resource node policy includes a mapping relationship between at least one resource node in the network and the at least one network slice and a resource weight of each resource node, and the resource weight of the resource node indicates a ratio of a resource of each of at least one network slice corresponding to the resource node to a resource of the resource node.

It should be understood that in the network slicing system 600 in this embodiment of this application, the application-aware analysis unit 610 may implement the corresponding procedure that may be executed by the application-aware analysis module in the method 200 shown in FIG. 2, the slicing decision orchestration unit 620 may implement the corresponding procedure that may be executed by the slicing decision orchestration module in the method 200 shown in FIG. 2, and the slicing control unit 630 may implement the corresponding procedure that may be executed by the slicing control module in the method 200 shown in FIG. 2. In addition, the units in the network slicing system 600 may further implement other operations and functions that may be implemented by the corresponding units in the method 200 shown in FIG. 2. For brevity, details are not described herein again.

Therefore, in this embodiment of this application, the network slicing system can obtain the classification policy based on the metadata information of the traffic flows, and can obtain accurate network requirements of different types of traffic flows according to the classification criterion in the classification policy. In this way, a network slice weight of a network slice can be determined based on a network requirement of a traffic flow, so that network slices can meet network requirements of different types of services while efficient network utilization is met. In addition, the network slicing system can dynamically adjust the network slicing policy according to metadata information that is of the traffic flows and that is collected in real time, so that network slices can meet network requirements of different types of dynamically changed services.

Figure 7:
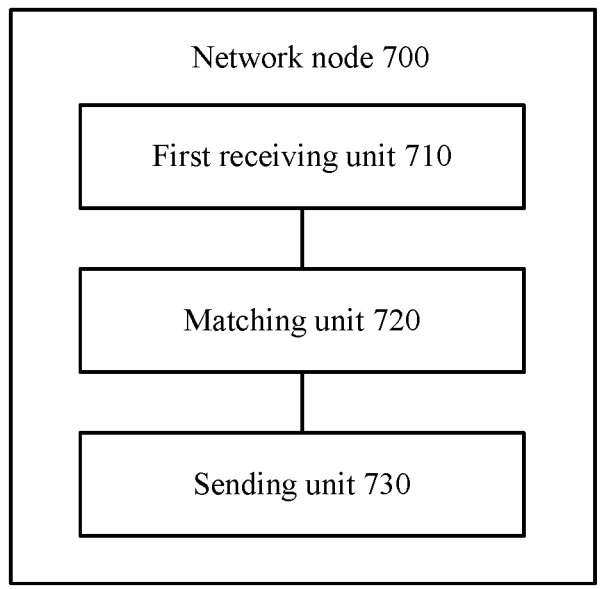
FIG. 7 is a schematic block diagram of a network node according to an embodiment of this application.

FIG. 7 shows a network node 700 according to an embodiment of this application. The network node 700 includes a first receiving unit 710, a matching unit 720, and a sending unit 730.

The first receiving unit 710 is configured to receive a to-be-transmitted traffic flow, where the to-be-transmitted traffic flow carries a network slice identifier, and a network slice identified by the network slice identifier is corresponding to a traffic flow type of the to-be-transmitted traffic flow.

The matching unit 720 is configured to perform flow table matching according to the network slice identifier received by the first receiving unit.

The sending unit 730 is configured to send the to-be-transmitted traffic flow according to a flow table obtained by the matching unit after the matching and a resource weight, where the resource weight is a bandwidth weight of the network slice at a corresponding physical port of the network node.

The units and the foregoing and other operations or functions in the signal network node 700 in this embodiment of this application are respectively used to execute the corresponding procedure executed by the network node in the method shown in FIG. 4. For brevity, details are not described herein again.

The network node in this embodiment of this application schedules a traffic flow by using a network slice to which the traffic flow belongs, so that mutual interference between traffic flows of different service types is avoided, and performance requirements of the traffic flows of the different service types can be met.

Figure 8:
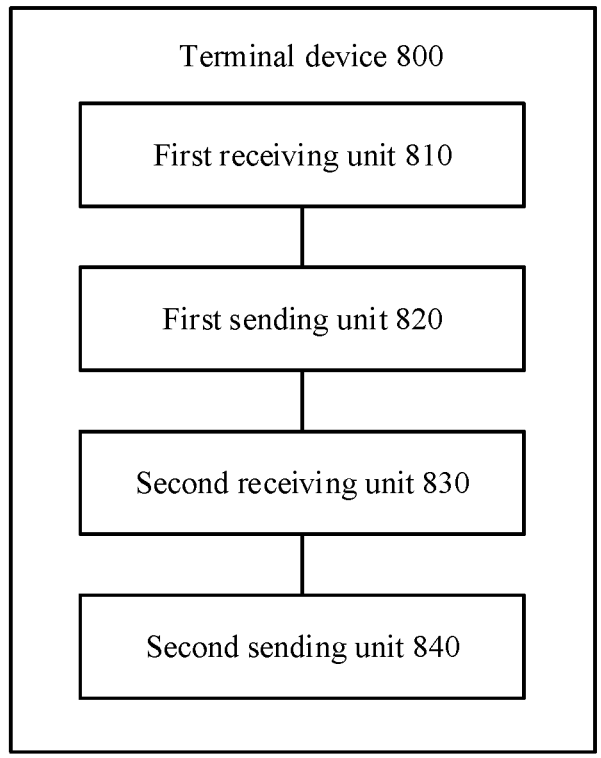
FIG. 8 is a schematic block diagram of a terminal device according to an embodiment of this application.

FIG. 8 shows a terminal device 800 according to an embodiment of this application. The terminal device 800 includes a first receiving unit 810, a first sending unit 820, a second receiving unit 830, and a second sending unit 840.

The first receiving unit 810 is configured to receive a to-be-transmitted traffic flow.

The first sending unit 820 is configured to send a request message to a centralized controller, where the request message carries 5-tuple information of a packet in the to-be-transmitted traffic flow received by the first receiving unit 810, and the request message is used to request network slice information corresponding to the to-be-transmitted traffic flow.

The 5-tuple information of the packet in the to-be-transmitted traffic flow received by the first receiving unit 810.

The second receiving unit 830 is configured to receive the network slice information that is sent by the centralized controller according to the 5-tuple information sent by the first sending unit 820, where a network slice indicated by the network slice information is corresponding to a service type of the to-be-transmitted traffic flow.

The second sending unit 840 is configured to send the to-be-transmitted traffic flow to a network node, where the packet in the to-be-transmitted traffic flow carries a network slice identifier identifying the network slice.

The units and the foregoing and other operations or functions in the signal terminal device 800 in this embodiment of this application are respectively used to execute the corresponding procedure executed by the terminal device in the method shown in FIG. 4. For brevity, details are not described herein again.

The terminal device in this embodiment of this application schedules a traffic flow by using a network slice to which the traffic flow belongs, so that mutual interference between traffic flows of different service types is avoided, and performance requirements of the traffic flows of the different service types can be met.

Figure 9:
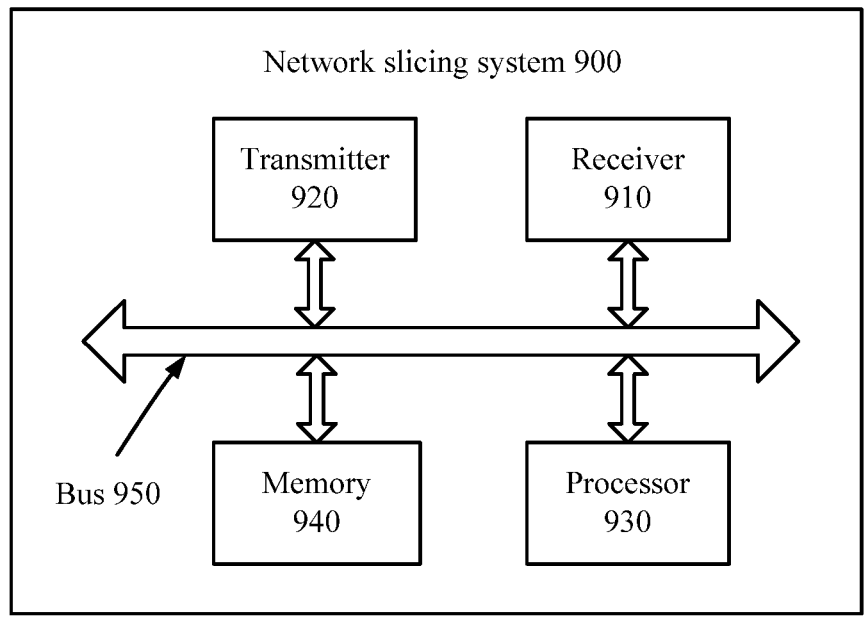
FIG. 9 is a schematic structural diagram of a network slicing system according to an embodiment of this application.

FIG. 9 shows a network slicing system 900 according to another embodiment of this application. The network slicing system 900 includes a receiver 910, a transmitter 920, a processor 930, a memory 940, and a bus system 950. The receiver 910, the transmitter 920, the processor 930, and the memory 940 are connected by using the bus system 950. The memory 940 is configured to store an instruction. The processor 930 is configured to execute the instruction stored in the memory 940, so as to control the receiver 910 to receive a signal and control the transmitter 920 to send a signal. The processor 930 is configured to:

transmitter 920 to send a signal. The processor 920 is configured to: obtain metadata information of each of multiple traffic flows, where the metadata information of the traffic flow is used to indicate a flow feature of the traffic flow, determine a classification policy according to metadata information of the multiple traffic flows, where the classification policy includes a classification criterion of at least one traffic flow type, and the traffic flow type includes at least one of the traffic flows, determine a network slicing policy according to the classification policy, where the network slicing policy is used to divide a network into at least one network slice, the network slicing policy includes a mapping relationship between a traffic flow type and a network slice and a slice weight of the network slice, and the slice weight indicates a ratio of a resource of the network slice to a resource of the network, and determine a resource node policy according to the network slicing policy, where the resource node policy includes a mapping relationship between at least one resource node in the network and the at least one network slice and a resource weight of each resource node, and the resource weight of the resource node indicates a ratio of a resource of each of at least one network slice corresponding to the resource node to a resource of the resource node.

It should be understood that in this embodiment of this application, the processor 930 may be a central processing unit (CPU), or the processor 930 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor, or the like.

The memory 940 may include a read-only memory and a random access memory, and provide an instruction and data to the processor 930. A part of the memory 940 may further include a nonvolatile random access memory. For example, the memory 940 may further store information about a device type.

In addition to a data bus, the bus system 950 may further include a power bus, a control bus, a status signal bus, and the like. However, for clear description, various types of buses in the figure are marked as the bus system 950.

In an implementation process, the operations in the foregoing method may be completed by using an integrated logic circuit of hardware in the processor 930 or an instruction in a form of software. The operations in the network slicing method disclosed with reference to the embodiments of this application may be directly performed by a hardware processor, or may be performed by using a combination of hardware in the processor and a software module. The software module may be located in a storage medium in the art, such as a random access memory, a flash memory, a read-only memory, a programmable read-only memory, an electrically erasable programmable memory, or a register. The storage medium is located in the memory 940. The processor 930 reads information from the memory 940, and completes the operations in the foregoing method in combination with the hardware in the processor. To avoid repetition, details are not described again herein.

The units and the foregoing and other operations or functions in the network slicing system 900 in this embodiment of this application may implement the corresponding procedures executed by the application-aware analysis module, the slicing decision orchestration module, and the slicing control module in the method 200 shown in FIG. 2. For brevity, details are not described herein again.

Therefore, the network slicing system in this embodiment of this application can obtain the classification policy based on the metadata information of the traffic flows, and can obtain accurate network requirements of different types of traffic flows according to the classification criterion in the classification policy. In this way, a network slice weight of a network slice can be determined based on a network requirement of a traffic flow, so that network slices can meet network requirements of different types of services while efficient network utilization is met. In addition, a control plane can dynamically adjust the network slicing policy according to metadata information that is of the traffic flows and that is collected in real time, so that network slices can meet network requirements of different types of dynamically changed services.

Figure 10:
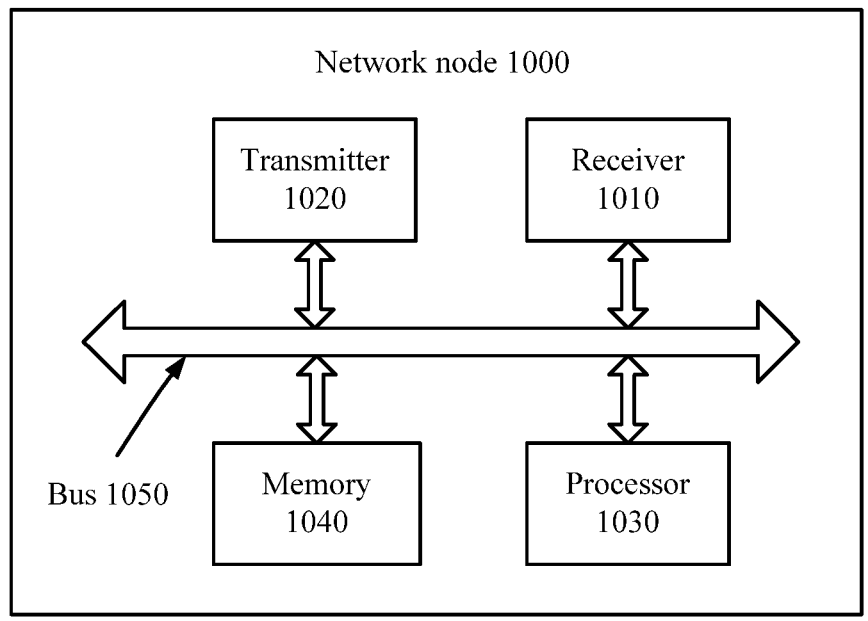
FIG. 10 is a schematic structural diagram of a network node according to an embodiment of this application.

FIG. 10 shows a network node 1000 according to an embodiment of this application. The network node 1000 includes a receiver 1010, a transmitter 1020, a processor 1030, a memory 1040, and a bus system 1050. The receiver 1010, the transmitter 1020, the processor 1030, and the memory 1040 are connected by using the bus system 1050. The memory 1040 is configured to store an instruction. The processor 1030 is configured to execute the instruction stored in the memory 1040, so as to control the receiver 1010 to receive a signal and control the transmitter 1020 to send a signal.

The receiver 1010 is configured to receive a to-be-transmitted traffic flow, where the to-be-transmitted traffic flow carries a network slice identifier, and a network slice identified by the network slice identifier is corresponding to a traffic flow type of the to-be-transmitted traffic flow.

The processor 1030 is configured to perform flow table matching according to the network slice identifier received by the receiver.

The transmitter 1020 is configured to send the to-be-transmitted traffic flow according to a flow table obtained by the processor after the matching and a resource weight, where the resource weight is a bandwidth weight of the network slice at a corresponding physical port of the network node.

It should be understood that in this embodiment of this application, the processor 1030 may be a central processing unit (CPU), or the processor 1030 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor, or the like.

The memory 1040 may include a read-only memory and a random access memory, and provide an instruction and data to the processor 1030. A part of the memory 1040 may further include a nonvolatile random access memory. For example, the memory 1040 may further store information about a device type.

In addition to a data bus, the bus system 1050 may further include a power bus, a control bus, a status signal bus, and the like. However, for clear description, various types of buses in the figure are marked as the bus system 1050.

In an implementation process, the operations in the foregoing method may be completed by using an integrated logic circuit of hardware in the processor 1030 or an instruction in a form of software. The operations in the traffic flow transmission method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1040. The processor 1030 reads information from the memory 1040, and completes the operations in the foregoing method in combination with the hardware in the processor. To avoid repetition, details are not described again herein.

The units and the foregoing and other operations or functions in the signal network node 1000 in this embodiment of this application are respectively used to execute the corresponding procedure executed by the network node in the method shown in FIG. 4. For brevity, details are not described herein again.

The network node in this embodiment of this application schedules a traffic flow by using a network slice to which the traffic flow belongs, so that mutual interference between traffic flows of different service types is avoided, and performance requirements of the traffic flows of the different service types can be met.

Figure 11:
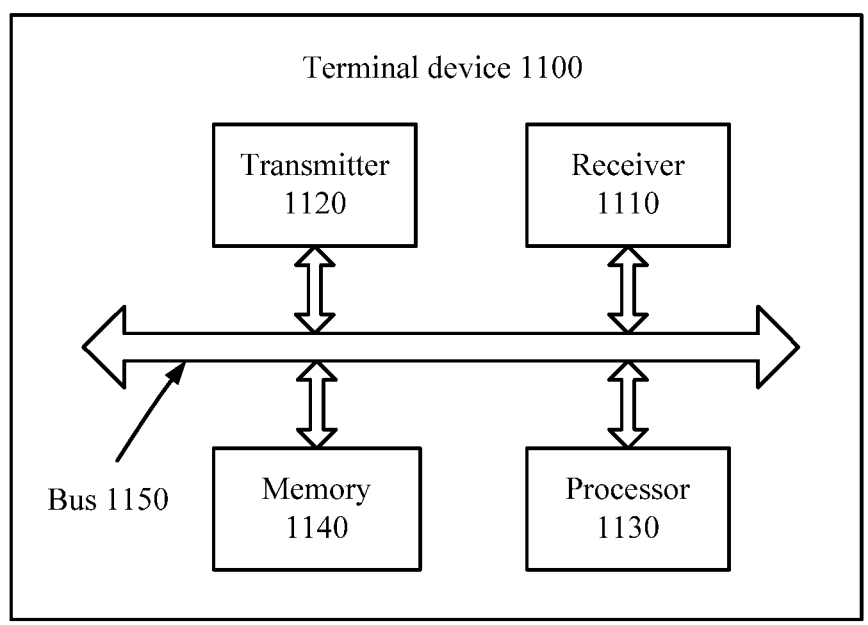
FIG. 11 is a schematic structural diagram of a terminal device according to an embodiment of this application.

FIG. 11 shows a terminal device 1100 according to an embodiment of this application. The terminal device 1100 includes a receiver 1110, a transmitter 1120, a processor 1130, a memory 1140, and a bus system 1150. The receiver 1110, the transmitter 1120, the processor 1130, and the memory 1140 are connected by using the bus system 1150. The memory 1140 is configured to store an instruction. The processor 1130 is configured to execute the instruction stored in the memory 1140, so as to control the receiver 1110 to receive a signal and control the transmitter 1120 to send a signal.

The receiver 1110 is configured to receive a to-be-transmitted traffic flow.

The transmitter 1120 is configured to send a request message to a centralized controller, where the request message carries 5-tuple information of a packet in the to-be-transmitted traffic flow received by the receiver 1110, and the request message is used to request network slice information corresponding to the to-be-transmitted traffic flow.

The receiver 1110 is further configured to receive the network slice information sent by the centralized controller according to the 5-tuple information, where a network slice indicated by the network slice information is corresponding to a service type of the to-be-transmitted traffic flow.

The transmitter 1120 is further configured to send the to-be-transmitted traffic flow to a network node, where the packet in the to-be-transmitted traffic flow carries a network slice identifier identifying the network slice.

It should be understood that in this embodiment of this application, the processor 1130 may be a central processing unit (CPU), or the processor 1130 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor, or the like.

The memory 1140 may include a read-only memory and a random access memory, and provide an instruction and data to the processor 1130. A part of the memory 1140 may further include a nonvolatile random access memory. For example, the memory 1140 may further store information about a device type.

In addition to a data bus, the bus system 1150 may further include a power bus, a control bus, a status signal bus, and the like. However, for clear description, various types of buses in the figure are marked as the bus system 1150.

In an implementation process, the operations in the foregoing method may be completed by using an integrated logic circuit of hardware in the processor 1130 or an instruction in a form of software. The operations in the traffic flow transmission method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1140. The processor 1130 reads information from the memory 1140, and completes the operations in the foregoing method in combination with the hardware in the processor. To avoid repetition, details are not described again herein.

The units and the foregoing and other operations or functions in the signal terminal device 1100 in this embodiment of this application are respectively used to execute the corresponding procedure executed by the terminal device in the method shown in FIG. 4. For brevity, details are not described herein again.

The terminal device in this embodiment of this application schedules a traffic flow by using a network slice to which the traffic flow belongs, so that mutual interference between traffic flows of different service types is avoided, and performance requirements of the traffic flows of the different service types can be met.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed systems, apparatuses, and methods may be implemented in other manners. For example, the described apparatus embodiments are merely examples. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on multiple network units. Some or all of the units may be selected according to actual requirements to achieve the objectives of the solutions in the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the operations in the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network slicing method, comprising:
   obtaining metadata information of each of multiple traffic flows based on an analysis of characteristics of respective packets of the multiple traffic flows, wherein the metadata information of the traffic flow is used to indicate a flow feature of the traffic flow;
   determining a classification policy based on the metadata information of the multiple traffic flows, wherein the classification policy comprises a classification criterion of at least one traffic flow type, the classification criterion comprises a range of one or more of the characteristics of the respective packets of the multiple traffic flows of the traffic flow type, and the classification policy is determined based on a match between the metadata information of the multiple traffic flows and the classification criterion of the classification policy;
   determining a network slicing policy according to the classification policy, wherein the network slicing policy is used to divide a network into at least one network slice, the network slicing policy comprises a mapping relationship between a traffic flow type and a network slice and a slice weight of the network slice, and the slice weight indicates a ratio of a resource of the network slice to a resource of the network, and the resource comprises a computing resource of a communication network;
   determining a resource node policy according to the network slicing policy, wherein the resource node policy comprises a mapping relationship between at least one resource node in the network and the at least one network slice and a resource weight of each resource node, and the resource weight of the resource node indicates a ratio of a resource of each of network slices corresponding to the resource node to a resource of the resource node;
   receiving a request message from a terminal device, wherein the request message includes 5-tuple information of a packet in a to-be-transmitted traffic flow prior to transmission of the to-be-transmitted traffic flow by the terminal device, and the request message is used to request network slice information based on the 5-tuple information of the packet in the to-be-transmitted traffic flow;
   determining the network slice information according to the 5-tuple information of the packet in the to-be-transmitted traffic flow and the network slicing policy; and
   transmitting, to the terminal device, a response message, wherein the response message comprises the network slice information including a network slice identifier of the at least one network slice.

2. The method according to claim 1, further comprising:
   sending configuration information to the resource node, wherein the configuration information comprises the network slice identifier of the at least one network slice corresponding to the resource node and resource weight information of the resource node, and the resource weight information is used to indicate a resource weight of the resource node.

3. The method according to claim 1, wherein the determining the network slicing policy according to the classification policy comprises:
   determining the network slicing policy according to the classification policy and a business support system (BSS) business policy; or
   determining the network slicing policy according to the classification policy and an operation support system (OSS) business policy.

4. The method according to claim 1, wherein the resource node comprises a distributed network node, and the resource of the network slice comprises a quantity of packet processing units, a quantity of packet sending queues and a packet sending queue length, and physical port bandwidth of the distributed network node; and/or
   the resource node comprises a distributed computing node, and the resource of the network slice comprises a quantity of virtual central processing units of the computing node; and/or
   the resource node comprises a distributed storage node, and the resource of the network slice comprises a quantity of storage units of the storage node.

5. The method according to claim 1, wherein the resource weight of the resource node comprises a ratio of bandwidth that is occupied at a physical port of the resource node by each network slice corresponding to the resource node to total bandwidth of the physical port.

6. The method according to claim 1, wherein the metadata information of each of the traffic flows comprises 5-tuple information of the respective packets in the traffic flows.

7. The method according to claim 1, wherein the metadata information of each of the traffic flows comprises at least one of the following information:
   an establishment time of the traffic flow, packet burstiness in the traffic flow, an average packet length in the traffic flow, a transmission time interval between adjacent packets in the traffic flow, a total length of the traffic flow, total duration of the traffic flow, or an average rate of the traffic flow.

8. The method according to claim 1, wherein the determining the classification policy based on the metadata information of the multiple traffic flows comprises:
classifying the multiple traffic flows according to an average packet length in each of the multiple traffic flows, an average interval between adjacent packets in each of the multiple traffic flows, and a total length of each of the multiple traffic flows; and
determining the classification policy according to a classification result.

9. The method according to claim 1, further comprising:
receiving a report message sent by the terminal device, wherein the report message includes metadata information of the to-be-transmitted traffic flow.

10. A network slicing system comprising: a processor and a memory, wherein the memory stores instructions and the processor is configured to execute the instructions to perform the following operations:
obtain metadata information of multiple traffic flows based on an analysis of characteristics of respective packets of the multiple traffic flows, wherein the metadata information of the traffic flows is used to indicate flow features of the traffic flows;
determine a classification policy based on the metadata information of the multiple traffic flows, wherein the classification policy comprises a classification criterion of at least one traffic flow type, the classification criterion comprises a range of one or more of the characteristics of the respective packets of the multiple traffic flows of the traffic flow type, and the classification policy is determined based on a match be, and the classification policy is determined based on a match between the metadata information of the multiple traffic flows and the classification criterion of the classification policy;
determine a network slicing policy according to the classification policy, wherein the network slicing policy is used to divide a network into at least one network slice, the network slicing policy comprises a mapping relationship between a traffic flow type and a network slice and a slice weight of the network slice, and the slice weight indicates a ratio of a resource of the network slice to a resource of the network, and the resource comprises a computing resource of a communication network;
determine a resource node policy according to the network slicing policy, wherein the resource node policy comprises a mapping relationship between at least one resource node in the network and the at least one network slice and a resource weight of each resource node, and the resource weight of the resource node indicates a ratio of a resource of each of network slices corresponding to the resource node to a resource of the resource node;
receive a request message from a terminal device, wherein the request message includes 5-tuple information of a packet in a to-be-transmitted traffic flow prior to transmission of the to-be-transmitted traffic flow by the terminal device, and the request message is used to request network slice information based on the 5-tuple information of the packet in the to-be-transmitted traffic flow;

determine the network slice information according to the 5-tuple information of the packet in the to-be-transmitted traffic flow and the network slicing policy; and
transmit, to the terminal device, a response message, wherein the response message comprises the network slice information including a network slice identifier of the at least one network slice.

11. The system according to claim 10, wherein the processor is further configured to:
send configuration information to the resource node, wherein the configuration information comprises the network slice identifier of the at least one network slice corresponding to the resource node and resource weight information of the resource node, and the resource weight information is used to indicate a resource weight of the resource node.

12. The system according to claim 10, wherein the processor is further configured to:
determine the network slicing policy according to the classification policy and a business support system (BSS) business policy; or
determine the network slicing policy according to the classification policy and an operation support system (OSS) business policy.

13. The system according to claim 10, wherein the resource node comprises a distributed network node, and the resource of the network slice comprises a quantity of packet processing units, a quantity of packet sending queues and a packet sending queue length, and physical port bandwidth of the distributed network node; and/or
the resource node comprises a distributed computing node, and the resource of the network slice comprises a quantity of virtual central processing units of the computing node;
and/or the resource node comprises a distributed storage node, and the resource of the network slice comprises a quantity of storage units of the storage node.

14. The system according to claim 10, wherein the resource weight of the resource node comprises a ratio of bandwidth that is occupied at a physical port of the resource node by each network slice corresponding to the resource node to total bandwidth of the physical port.

15. The system according to claim 10, wherein the metadata information of the traffic flows comprises 5-tuple information of the respective packets in the traffic flows.

16. The system according to claim 10, wherein the processor is further configured to:
classify the multiple traffic flows according to an average packet length in each of the multiple traffic flows, an average interval between adjacent packets in each of the multiple traffic flows, and a total length of each of the multiple traffic flows; and
determine the classification policy according to a classification result.

17. The system according to claim 10, wherein the processor is further configured to:
receive a report message sent by the terminal device, wherein the report message carries metadata information of the to-be-transmitted traffic flow.

18. A non-transitory computer-readable medium having instructions stored therein, which when executed by a processor, cause the processor to perform operations, the operations comprising:
obtaining metadata information of each of multiple traffic flows based on an analysis of characteristics of respective packets of the multiple traffic flows, wherein the metadata information of the traffic flow is used to indicate a flow feature of the traffic flow;

determining a classification policy based on the metadata information of the multiple traffic flows, wherein the classification policy comprises a classification criterion of at least one traffic flow type, the classification criterion comprises a range of one or more of the characteristics of the respective packets of the multiple traffic flows of the traffic flow type, and the classification policy is determined based on a match between the metadata information of the multiple traffic flows and the classification criterion of the classification policy;

determining a network slicing policy according to the classification policy, wherein the network slicing policy is used to divide a network into at least one network slice, the network slicing policy comprises a mapping relationship between a traffic flow type and a network slice and a slice weight of the network slice, and the slice weight indicates a ratio of a resource of the network slice to a resource of the network, and the resource comprises a computing resource of a communication network;

determining a resource node policy according to the network slicing policy, wherein the resource node policy comprises a mapping relationship between at least one resource node in the network and the at least one network slice and a resource weight of each resource node, and the resource weight of the resource node indicates a ratio of a resource of each of network slices corresponding to the resource node to a resource of the resource node;

receiving a request message from a terminal device, wherein the request message includes 5-tuple information of a packet in a to-be-transmitted traffic flow prior to transmission of the to-be-transmitted traffic flow by the terminal device, and the request message is used to request network slice information based on the 5-tuple information of the packet in the to-be-transmitted traffic flow;

determining the network slice information according to the 5-tuple information of the packet in the to-be-transmitted traffic flow and the network slicing policy; and transmitting, to the terminal device, a response message, wherein the response message comprises the network slice information including a network slice identifier of the at least one network slice.

* * * * *